United States Patent
Liao et al.

(10) Patent No.: US 11,947,415 B2
(45) Date of Patent: Apr. 2, 2024

(54) SYSTEM AND METHOD FOR EFFICIENT REAL TIME LOG EXPORT AND VIEW IN A MICRO SERVICES SYSTEM

(71) Applicant: DELL PRODUCTS L.P., Round Rock, TX (US)

(72) Inventors: Mengze Liao, Shanghai (CN); Pankaj Pande, Carlingford (AU); Jinjin Wang, Shanghai (CN); Scott Quesnelle, Burlington (CA)

(73) Assignee: DELL PRODUCTS L.P., Round Rock, TX (US)

( * ) Notice: Subject to any disclaimer, the term of this patent is extended or adjusted under 35 U.S.C. 154(b) by 107 days.

(21) Appl. No.: 17/574,906

(22) Filed: Jan. 13, 2022

(65) Prior Publication Data
US 2023/0222028 A1 Jul. 13, 2023

(51) Int. Cl.
*G06F 11/00* (2006.01)
*G06F 9/455* (2018.01)
*G06F 11/07* (2006.01)

(52) U.S. Cl.
CPC ...... *G06F 11/0784* (2013.01); *G06F 9/45558* (2013.01); *G06F 11/0781* (2013.01); *G06F 11/0787* (2013.01); *G06F 2009/4557* (2013.01); *G06F 2009/45591* (2013.01)

(58) Field of Classification Search
CPC ............ G06F 11/0784; G06F 11/0781; G06F 11/0787
See application file for complete search history.

(56) References Cited

U.S. PATENT DOCUMENTS

2022/0046038 A1* 2/2022 Sinha .................. H04L 63/0236

* cited by examiner

*Primary Examiner* — Philip Guyton
(74) *Attorney, Agent, or Firm* — WOMBLE BOND DICKINSON (US) LLP

(57) ABSTRACT

According to various embodiments, a method, medium, and system for exporting log messages related to a particular job running in a micro services system is described in this disclosure. The method uses a mapping table to narrow down the search scope for finding relevant log files. The mapping table maps a job attribute combination to one or more micro services, and thus will direct the search for relevant log messages only to those log files related to the one or more micro services. The search scope can be further narrowed down using a start time and end time of the job. Once the relevant log files are found, log messages containing an identifier of the job can be extracted from the relevant log files for display or for a user to download. The mapping table can be automatically generated by parsing through historical files in a system non-busy time.

20 Claims, 9 Drawing Sheets

Mapping Table
112

| Asset Type | Job Type | Mode of Trigger | Status | Services to Print Log |
|---|---|---|---|---|
| VM | Backup | Policy | Success | Scheduler, Workflow, VMDM |
| VM | Backup | Policy | Failed | CBS, Workflow, VMDM |
| VM | Backup | User | Success | Scheduler, Workflow, ADM |
| VM | Backup | User | Failed | CBS, Workflow, VMDM |
| VM | Restore | Policy | Success | Scheduler, Workflow, VMDM |
| VM | Restore | Policy | Failed | CBS, Workflow, VMDM |
| VM | Restore | User | Success | Scheduler, Workflow, VMDM |
| VM | Restore | User | Failed | CBS, Workflow, VMDM |
| SQL | Restore | Policy | Success | CBS, Workflow, ADM |
| ... | ... | ... | ... | ... |

- Policy A Configuration:
  - VM protection with 100 assets
  - Daily backup from 8:00PM to 6:30 AM
  - Replication from 6:00AM to 4:00PM
  - Asset number: 100 VMs

- Policy B Configuration
  - Oracle protection with 50 assets
  - Saturday weekly Full, from 8:00 PM to 8:00 PM
  - Daily Incremental, from 8:00 PM to 8:00 AM
  - 15 minutes log for 24 hours

| Job ID 601 | Status 603 | Description 605 | Trigger 607 | Asset Type 609 | Job Type 611 | Time Stamp 613 |
|---|---|---|---|---|---|---|
| VDDGSH | Success | Protecting NAS | Policy | Virtual Machine | Backup | Apr 4, 2021 00:00:01 EST – Apr 8, 2021 00:00:01 EST |
| | | | | | ⋮ | |

FIG. 6

SYSTEM AND METHOD FOR EFFICIENT REAL TIME LOG EXPORT AND VIEW IN A MICRO SERVICES SYSTEM

FIELD OF THE INVENTION

Embodiments of the present invention relate generally to data storage systems. More particularly, embodiments of the invention relate to efficient real time log export and view in a micro services system.

BACKGROUND

In a data protect manager system, such as the PowerProtect Data Manager (PPDM) from Dell EMC™, a variety of transactions may be performed, such as data deduplication, data backup and data recovery. In such a data protect manager system, log messages with certain requirements often need to be retrieved for purposes such as system debugging, and auditing.

Currently, log messages for a particular transaction are traced across multiple micro services using a tracing context. When a user needs to export or view log messages related to a completed job from a graphical user interface, the user often clicks on an export log button to trigger a background process to extract log messages containing the tracing contexts of the job from log files, which are identified after searching through all the micro services in the data protect manager system.

The above approach has serious performance issues in a micro services system that may have dozens of micro services. In such a micro services system, each micro service may have generated dozens of historical log files. Thus, in the above approach, about 1000 log files may need to be collected, parsed, and grepped for a small portion of relevant log messages.

Several solutions for the above performance issues are offered but none of them is ideal for a micro service system that typically installed on a single virtual machine. One of the solutions is to index log messages at runtime for faster retrieval, but this solution requires more system resources, such as CPU and memory, and thus is not cost effective for a data protect manager system running on a single node (e.g., a single virtual machine), because a full software stack needs to be maintained for performing real time log message indexing and a single node virtual machine may not have the system resources for the full software stack. The second solution is to pre-parse and pre-generate log files per job/tracing context on a schedule basis, but this solution is also computing resources intensive, slow, and wastes system resources because the data protect manager has to parse all log files for a small portion of relevant messages in only some of the log files.

BRIEF DESCRIPTION OF THE DRAWINGS

Embodiments of the invention are illustrated by way of example and not limitation in the figures of the accompanying drawings in which like references indicate similar elements.

FIG. 3 illustrates an example of the mapping table 112 according to one embodiment.

FIG. 6 illustrates a graphical user interface where a log viewing or export operation can be requested according to one embodiment.

DETAILED DESCRIPTION

Figure 1:
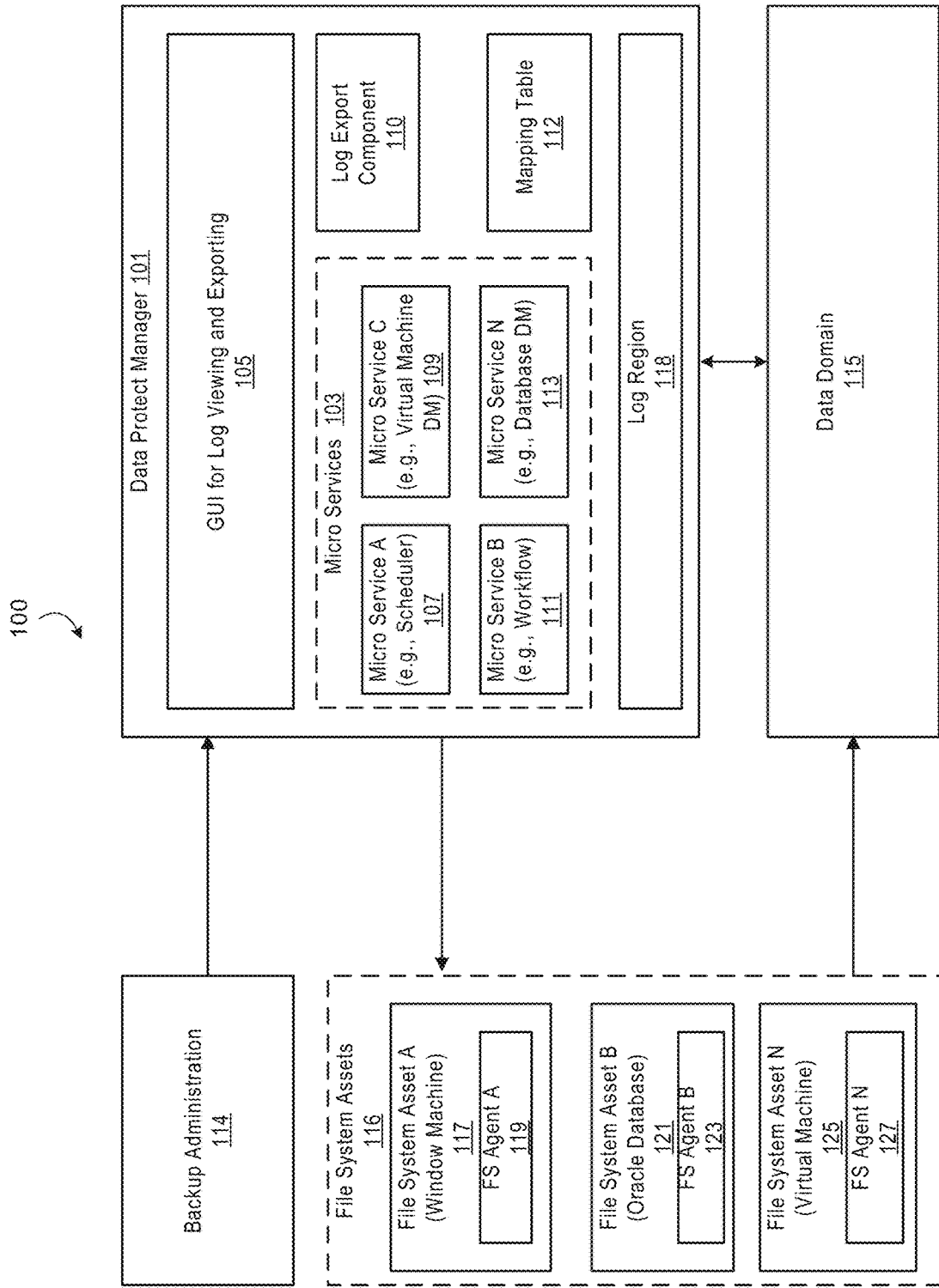
FIG. 1 is a block diagram illustrating a micro services system 100 according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, a method, medium, and system for exporting log messages related to a particular job running in a micro services system is described in this disclosure. The method uses a mapping table to narrow down the search scope for finding relevant log files. The mapping table maps a job attribute combination to one or more micro services, and thus will direct the search for relevant log messages only to those log files related to the one or more micro services. The search scope can be further narrowed down using a start time and end time of the job. Once the relevant log files are found, log messages containing an identifier of the job can be extracted from the relevant log files for display or for a user to download. The mapping table can be automatically generated by parsing through historical files in a system non-busy time.

In one embodiment, an exemplary method includes receiving, by a data protect manager, a request for exporting log messages related to a job, the request including a plurality of attributes of the job; retrieving, by the data protect manager, one or more micro services from a mapping table based on values of the plurality of attributes, the mapping table including an entry for each unique combination of values of the plurality of attributes, the entry mapping the unique combination to a set of micro services. The method further includes selecting, by the data protect manager, a first set of one or more log files corresponding to the one or more micro services from a plurality of log files generated by the micro services system; and selecting, by the data manager, a second set of one or more log files from the first set of one or more log files, each of the second set of one or more log files generated within a time period between a start time of the job and an end time of the job. The method also includes retrieving log messages containing an identifier of the job from the second set of one or more log files.

In one embodiment, the plurality of attributes include a job type, an asset type, a mode of trigger, and a job status. The mapping table is generated by the data protect manager from a plurality of log files generated by the micro services system in one or more system non-busy periods of time in the past, and each of the one or more system non-busy times is determined based on configurations for jobs that generated the plurality of log files in the past.

In one embodiment, the mapping table is generated by the data protect manager from the plurality of log files generated by the micro services system using one or more low-priority threads in the system non-busy times and/or in one or more other times.

In one embodiment, the request for exporting log messages related to the job is made via a graphical user interface of the data protect manager by a user checking a check box.

The embodiments described above are not exhaustive of all aspects of the present invention. It is contemplated that the invention includes all embodiments that can be practiced from all suitable combinations of the various embodiments summarized above, and also those disclosed below.

FIG. 1 is a block diagram illustrating a micro services system 100 according to one embodiment. The micro service system 100 can be used to provide the ability to discover, manage, monitor data protection and replication for file system assets.

As shown in FIG. 1, the micro services system 100 can include a data protect manager 101 that can communicate with file system assets 116 via file system agents. The file system assets 116 can include a variety of assets, including file system asset A 117, which can be a window machine; file system asset B 121, which can be an Oracle database; and file system asset N 125, which can be a virtual machine. Each of the file system assets 116 can include a file system agent, such as file system agent A 119 for file system asset A 117, file system agent B 123 for file system asset B 121, and file system agent N 127 for file system asset N 125.

The data protect manager 101 can include a number of micro services 103 configured to perform multiple different types of job (e.g., data backup, restore etc.) on the file system assets 116 through their respective file system agents 119, 123, and 127. Examples of the types of jobs include data backup, restore, replication, cloud disaster recover (DR), cloud tiering, and discovery. Each type of jobs needs the participation of one or more of the micro services 103.

In one embodiment, the micro services 103 are provided for the purpose of illustration. In actual implementation, there can be many other micro services. For example, the micro services 103 can include one or more auxiliary operations, and a micro service for each type of file system asset. In this embodiment, the micro services 103 includes micro service A 107, which can be a job scheduling micro service; micro service B 111, which can be a workflow management micro service; micro service C 109 for a virtual machine; and micro service N 113 for a database system.

As shown in FIG. 1, the micro services system 100 can also include a backup administration component 114 for creating file system backup configurations, and a data domain 115 for storing data backups.

In one embodiment, a file system backup configuration can specify that a backup job is to be performed within a particular window of time on certain asserts. At the time of the scheduled backup, the data protect manager requests one or more of the file system agents 116 to perform save operation for their respective file system data. The file system agent can parse the backup job request and convert the backup job request into utility commands for performing the save operation. The fie system agent can create or verify a storage-unit for the data on the data domain 115. On successful verification, the file system agent can write the file system data directly to the storage-unit created on the data domain 115. Each operation in the above process is recorded in a log file in a log region 118, which can be a partition, a drive in a single node virtual machine, a drive in the virtual machine or a directory on the virtual machine.

In one embodiment, to perform a restore, the data protect manager 101 can construct recovery job details based on the UI inputs provided by backup administrator through the backup administration component 114. The UI inputs can include a source file system backup, a destination file system, restore options, a restore file location, and storage information. After constructing the recovery job details, the data protect manager 101 can dispatch this operation to a corresponding file system agent, which parses the recovery job request and converts the job request into utility commands and executes the command based on the inputs provided. The file system agent can verify the storage-unit connectivity on the data domain 115 and retrieve the required file system data. The retrieved file system data can be restored to the destination specified by file system administrator or user.

The above description of the backup job and the restore job are workflows of two types of the jobs that the micro services system 100 can perform. Workflows of other types of jobs that can be performed by the micro services system 100 are not detailed here.

In one embodiment, for each type of job, one or more log files can be generated at the log region 118 to record the corresponding workflow.

As described above, due to the number of micro services, and the number of jobs performed, the log region 118 may include thousands of log files over a period of time (e.g., 15 days). Thus, traditionally, when a user attempts to export all log messages related to a particular job for either debugging or auditing purpose or another purpose via a graphical user interface (GUI) 105, the data protect manager 101 needs to search through all the log files in the logo region 118 to obtain the relevant log messages. As a result, an existing micro services system is not likely to fetch real-time log messages.

FIG. 1 describes a system to address the performance issues in log export and viewing by providing a log export component 110 and a mapping table 112. The mapping table 112 can be used to narrow the search scope for relevant log messages. The log export component 110 can parse through log files in the log region 118 periodically in one or more low-priority threads or at a system non-busy time to dynamically create the mapping table 112.

The mapping table 112 includes entries that map a particular combination of job attributes to one or more micro services, such that when a log viewing export or viewing request is received, the micro services system 100 can narrow its search for the relevant log messages related to the job.

Figure 2:
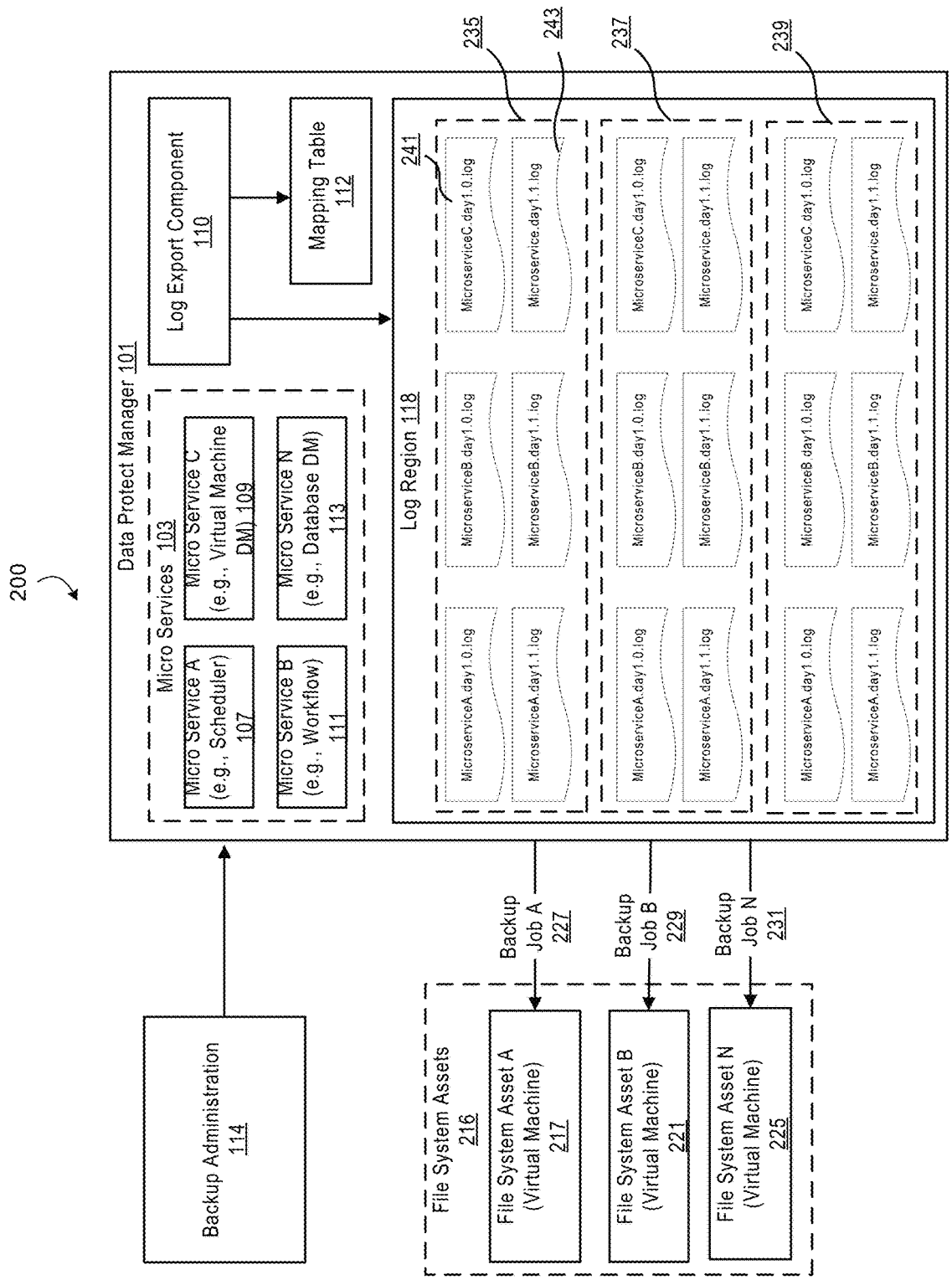
FIG. 2 illustrates a system for creating a mapping table through a self-learning process in a micro services system 200 according to one embodiment.

FIG. 2 illustrates a system for creating the mapping table 112 through a self-learning process in a micro services system 200 according to one embodiment.

In one embodiment, the log export component 110 can create an empty mapping table based all configuration files stored in the backup administration component 114. The configuration files can include all the file system assets in the micro services system 200, and types of job that can be performed in the micro service system 200.

For example, one such empty mapping table can have five columns: Asset Type, Job Type, Trigger, Status, and Services to Print Logs, as shown below in Table 1:

TABLE 1

| Asset Type | Job Type | Trigger | Status | Services to Print Logs |
| --- | --- | --- | --- | --- |
|  |  |  |  |  |

The micro services system 200 includes three file system assets: file systems asset A 217, file systems asset B 221, and file systems asset N 225. All three file system assets are virtual machines, and the data protect manager 101 has performed a backup job 227, 229, and 231 on each file system asset. As a result, three groups of log files 235, 237 and 239 have been generated in the log region 118 respectively: the group of log files 235 for backup job A 227, the group of log files 237 for backup job B 229, and the group of log files 239 for backup job N 231. Each group of log files 235, 237 and 239 can include one or more log files for each micro service participating in the corresponding job. The number of log files for each participating micro service depends on a predetermined size of a log file in the system, and the size of the log region 118.

In the embodiment illustrated in FIG. 1, each backup job can generate two log files for each participating micro service. For example, for the participating micro service C 109, the backup job 227 generates two log files 241 and 243.

As used herein, a participating micro service is a micro service related to a particular job. The participating micro service of a particular job can be defined at the programming level or design level by a programmer. Each related micro service to a particular job has one or more corresponding log files in the log region 118. In one embodiment, the three groups of log files 235, 237, and 239 can also be mixed together within a single directory, or each group of log files 235, 237, and 239 can be in its own directory.

The log export component 110 can retrieve the job ID for each job from a configuration stored in the data protect manager 101 or from a configuration file in the backup administration component 114. The job ID of each job can be context ID that uniquely identify the job.

Once the job ID of a job is retrieved, the log export component can parse through the most recent log file generated for each participating micro service for each job.

For example, for the backup job A 227, the log export component 110 can start with the log file 241 for the participating micro service C 109, and parse the log file 241 for the job ID of the backup job A 227. The parsing of the log file 241 can be performed using a "grep" command or a command performing a similar function.

The log export component 110 can examine the result of the "grep" command. As soon as a job ID of the backup job A is found in the result of the "grep" command, the log export component 110 can determine the mode of trigger for the job and the status of the job.

Since the job has been completed, the status and mode of trigger should be recorded in the log file 241. In this example, the job status can be "success", and the mode of trigger can be "policy", which means that the job has been triggered by a configuration file at a scheduled time rather than being manually triggered by a user.

The log export component 110 can then populate the empty mapping table 112 with "virtual machine" in the "Asset Type" column, "backup" in the "Job Type" column, "policy" in the "trigger" column, "success" in the "status" column, and "Micro service C" in the "Services to Print Logs" column.

The log export component 110 can stop examining the result of the "grep" command as soon as a mapping to an attribute combination is found in the result. The above process can be repeated for log files of other micro services. If the attribute combination is found in any other log file, the log export component 110 can populate the "Services to Print Logs" with the corresponding micro service.

The above description is for one type of job, namely, backup jobs on virtual machines. The log export component 110 can similarly perform the same operations on logs generated by other types of jobs to further populate the mapping table 112.

In one embodiment, each combination of the attributes defined by the first four columns of the mapping table 112 needs to be populated in a different row, together with micro services corresponding to the combination of the attributes.

In one embodiment, the export log export component 110 can perform the above operations each day in a system non-busy time or periodically using one or more low-priority threads.

FIG. 3 illustrates an example of the mapping table 112 according to one embodiment.

As shown in FIG. 3, the mapping table 112 has five columns 301, 303, 305, 307 and 309, and 9 rows. The mapping table 112 can be expanded automatically by the log export component 110 when additional file system assets and/or job types are added to a micro services system such as the micro services system 100 or 200. Thus, the mapping table 112 can be automatically generated and automatically updated, thus relieving users of the burden of creating and maintaining the mapping table 112.

As shown in FIG. 3, in one embodiment, the asset type and job type can define a unique job. The same job can have a separate entry (row) in the mapping table 112 for each different job status and each different mode of trigger.

Thus, each row represents a unique combination of attributes of a particular job with corresponding micro services. The corresponding micro services can serve as a guide for the log export component 110 to search only certain relevant log files related to the corresponding micro services.

Figure 4:
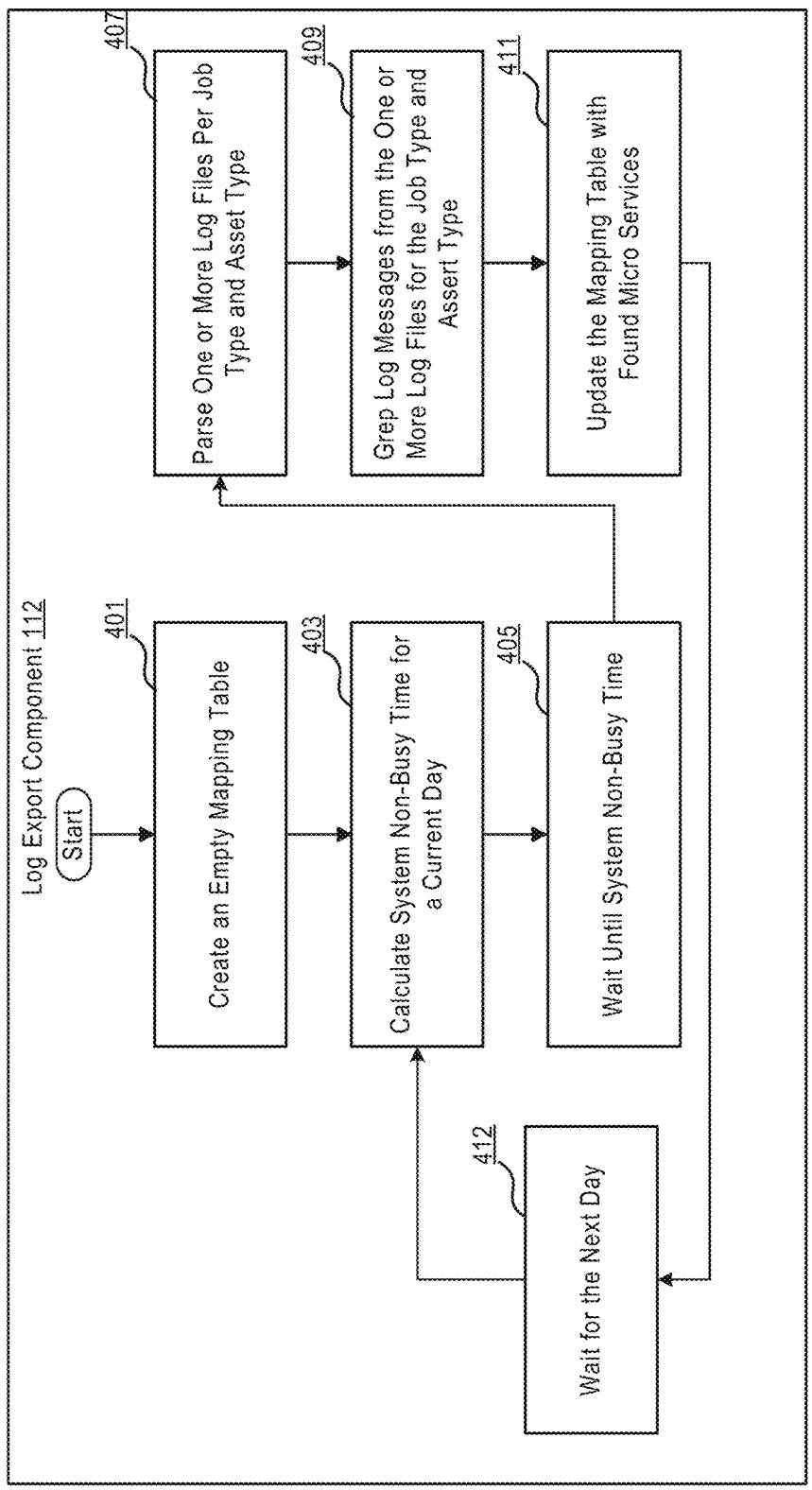
FIG. 4 illustrates a process for creating the mapping table 112 through a self-learning process in according to one embodiment.

FIG. 4 illustrates a process for creating the mapping table 112 through a self-learning process in according to one embodiment.

As shown in FIG. 4, in operation 401, the log export component 112 first creates an empty mapping table for mapping each job attribute combination to one or more micro services. Then, in operation 403, the log export component calculates a system non-busy time for a current day. The system non-busy time can be derived from job configuration files, which specify when jobs in a micro services system are scheduled to run.

In operation 405, the log export component 112 waits till the system non-busy time. Alternatively, the log export component can run the self-learning process with a low priority thread, which can reduce its impact on the protection jobs (e.g., backup, restore, etc.) in the micro services system. In one embodiment, a command "nice" in Linux or another command performing the same function can be used to lower the priority of the self-learning process. As another alternative, a "cgroups" command in Linux or a command performing the same function in other operating systems can be used to control the CPU and memory resources used by the self-learning process.

In operation 407, the log export component 112 can parse one or more log files for each job type and asset type (e.g., a backup job on a VM machine).

In operation 409, the log export component retrieves log messages corresponding to a combination of a job type and an asset type, e.g., using a "grep" command. The log messages would also include a mode of trigger and a job status.

In operation 411, the log export component updates the mapping table with the job type, the asset type, the mode of trigger, and the job status. If a particular attribute combination (e.g., a backup job on a VM machine that has been manually triggered with a "Failed" status) is found in a first portion of a first log file, the log export component 112 does not need to examine the remaining of the first log file, or search through the remaining log files generated for the same micro service in the particular time frame (e.g. a current day or the next day).

In operation 412, the above operations 401-411 are to be repeated the next day.

Figures 5A, 5B, 5C:
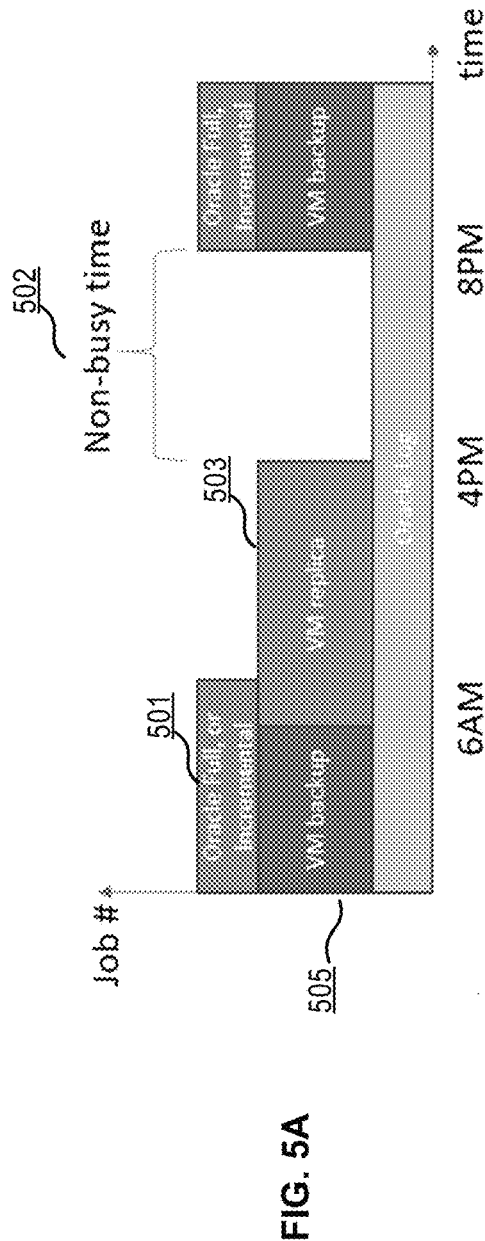
FIGS. 5A-5C illustrate a system non-busy time according to one embodiment.

FIGS. 5A-5C illustrate a system non-busy time according to one embodiment. FIG. 5A illustrates scheduled jobs 501, 503, and 505 in a 24-hour period on a particular day. The job schedules, as discussed above, can be found in job configurations of the micro services system.

As an illustrative example, the jobs are scheduled by the following two policy configurations as shown in FIG. 5B and FIG. 5C.

According to the policy A configuration in FIG. 5B, a VM backup job 505 on 100 VMs are to be performed from 8:00 PM to 6:00 AM, and a VM replication job 503 is to be performed from 6:00 AM to 4:00 PM on the 100 VMs.

According to the policy B configuration in FIG. 5C, a full Oracle backup job 501 on 50 VMs of the 100 VMs is to be performed each Saturday from 8:00 PM to 8:00 PM, and an incremental backup job 501 of the 500 VMs is to be performed daily from 8:00 PM to 8:00 AM.

Thus, based on the above policy configuration, a system non-busy time 502 is 4:00 PM to 8:00 PM on a working day.

FIG. 6 illustrates the graphical user interface 105 where a log view or export operation can be requested according to one embodiment.

As shown in FIG. 6, the GUI 105, as part of the data protect manager 101 shown in FIG. 1, can display a list of jobs that have been completed. For each job, the GUI 105 can display a corresponding job ID 601 that uniquely identifies the job; a job status 603 which indicates whether the job has been successfully run; a job description 605 that provides additional information for the job; a trigger 607 which specifies how the job has been triggered (manually triggered by a user or scheduled by a policy configuration); an asset type 609 that specify the type of assets that the job has operated on; a job type 611; and a time stamp 613 for the job, which describes when the job was started and when it ended.

As further shown, each job may have an associated check box 615 or another option button that can be used by a user. When the check box 615 is checked, a request for viewing all the log messages related to the job ID "VDDGSH" is sent to the log export component 110 described in FIG. 1, together with the associated attributes, including the status of "success", the trigger of "policy", the asset type of "virtual machine", and the job type of "backup", as well as the time stamp of "Apr. 4, 2021 00:00:01 EST-Apr. 8, 2021 00:00:01 EST".

The information contained in the request specifies a combination of job attributes, and can be used by the log export component 110 to narrow the scope of search for relevant log messages containing the job ID 601.

Figure 7:
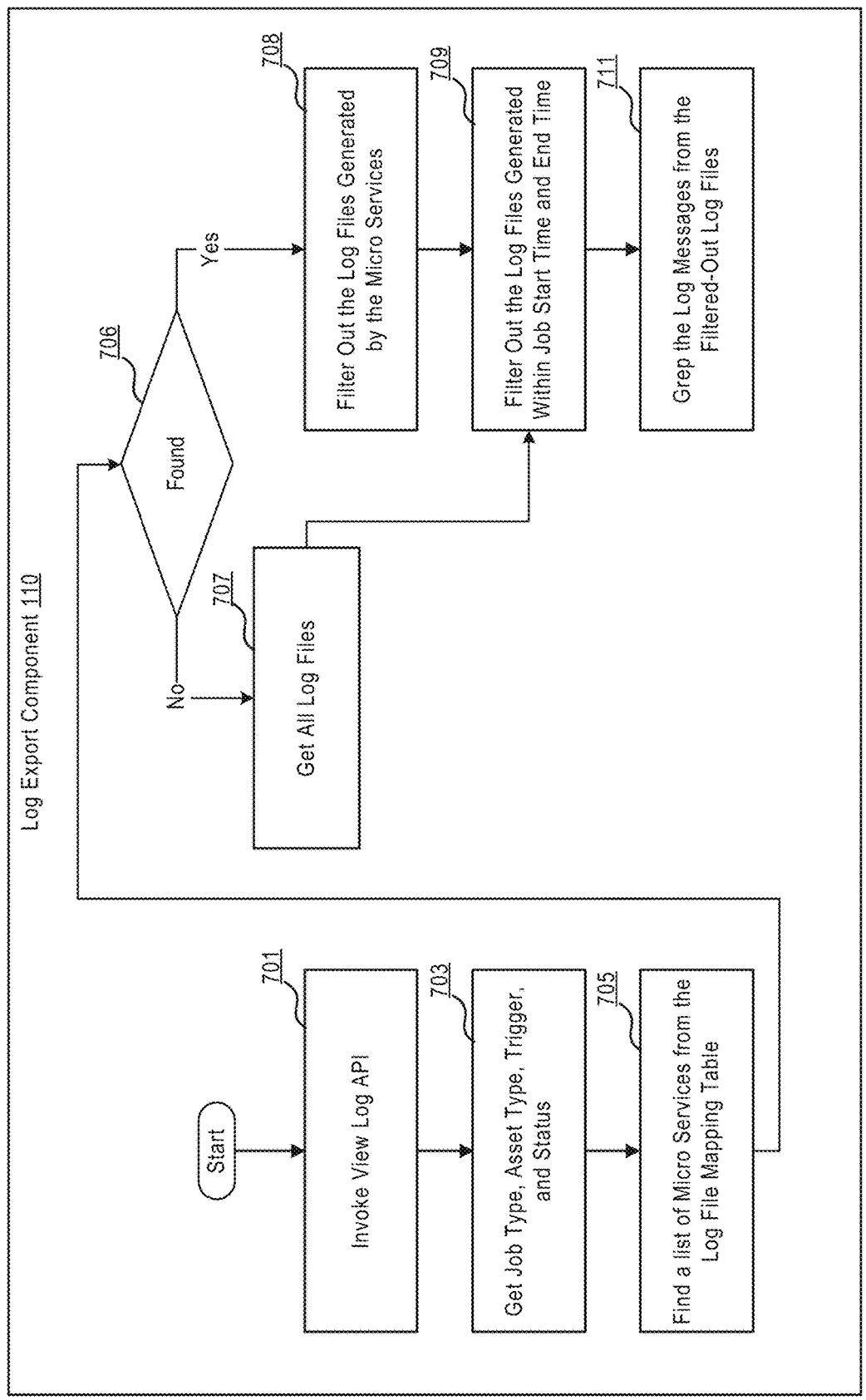
FIG. 7 illustrates a process of generating log messages for viewing according to one embodiment.

FIG. 7 illustrates a process of generating log messages for viewing according to one embodiment.

As shown in FIG. 7, in operation 701, a view log application programming interface (API) is invoked by a user checking a check box, or otherwise making a selection on the GUI 105 described in FIG. 6. The view log API triggers a view log request. In one embodiment, the view log API can be provided by the log export component 110, which also provides a set of API for creating the mapping table 112 as described in FIG. 3.

In operation 703, the log export component 110 obtains a job type, an asset type, a trigger, and a status from the log view request. As described in FIG. 6, these attributes are from the GUI 105 described in FIG. 6.

In operation 705, the log export component 110 operates to find an entry in the mapping table 112 as described in FIG. 3 based on the first four columns of the mapping table 112.

In operation 706, the log export component 110 checks whether an entry that matches the job type, the asset type, the trigger, and the status is found or not.

In operation 707, the log export component 110 did not find such a matching entry in the mapping table 112, and thus will get all log files.

In operation 708, the log export component 110 finds such a matching entry in the mapping table 112, and will filter out the log files generated by the corresponding micro services in the matching entry. In other words, the log export component 110 will ignore all the rest of the log files in the log region 118, and will only obtain the log files generated by the corresponding micro services in the matching entry. In one embodiment, the log export component 110 can obtain a name of each log file and a path to that log file such that when needed the log export component 110 can access the log file.

In operation 708, the log export component 110 performs another filtering operation to filter out log files within a particular window of time from the log files obtained in operation 708. The particular window of time can be the period of time from the start time of the job and the end time of the job.

In operation 711, the log export component 110 extracts log messages containing the job ID from the filtered out log files, and output the extracted log messages.

Figure 8:
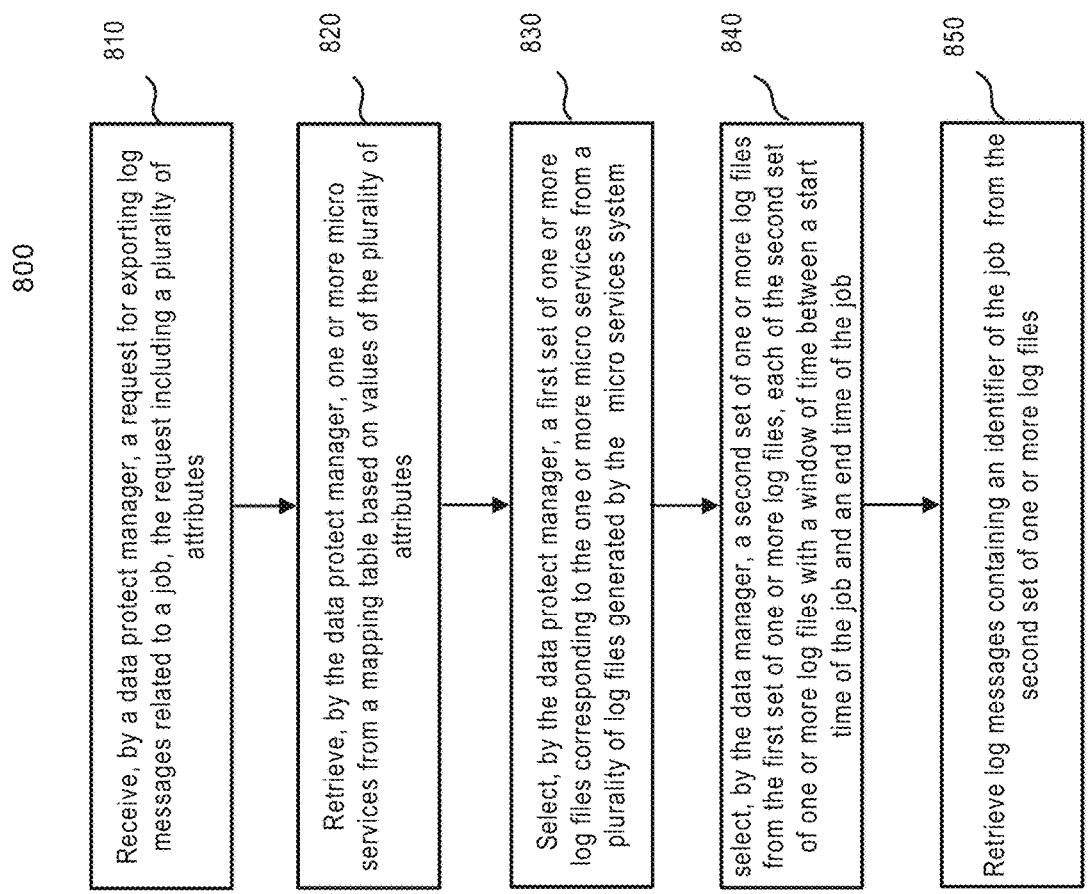
FIG. 8 is a flow diagram illustrating a process of exporting log messages in real time in a micro services system according to one embodiment.

FIG. 8 is a flow diagram illustrating a process 800 of exporting log messages in real time in a micro services system according to one embodiment. Process 800 may be performed by processing logic that includes hardware (e.g. circuitry, dedicated logic, etc.), software (e.g., embodied on a non-transitory computer readable medium), or a combination thereof. For example, process 800 may be performed by processor(s) 1501 of FIG. 9 or the data protect manager 101 in FIG. 1.

Referring to FIG. 8, in operation 810, the processing logic receives a request for exporting log messages related to a job identifier, the request including a plurality of attributes. In operation 820, the processing logic retrieves one or more micro services from a mapping table based on values of the plurality of attributes. The mapping table includes an entry for each unique combination of values of the plurality of attributes, the entry mapping the unique combination to a set of micro services. In operation 830, the processing logic selects a first set of one or more log files corresponding to the one or more micro services from a plurality of log files generated by the micro services system. In operation 840, the processing logic selects a second set of one or more log files from the first set of one or more log files, each of the second set of one or more log files generated within a window of time between a start time of the job and an end time of the job. In operation 850, the processing logic retrieves log messages containing an identifier of the job from the second set of one or more log files, and displaying the log messages in a graphical user interface (GUI or presents a link for a user to download the log messages.

Figure 9:
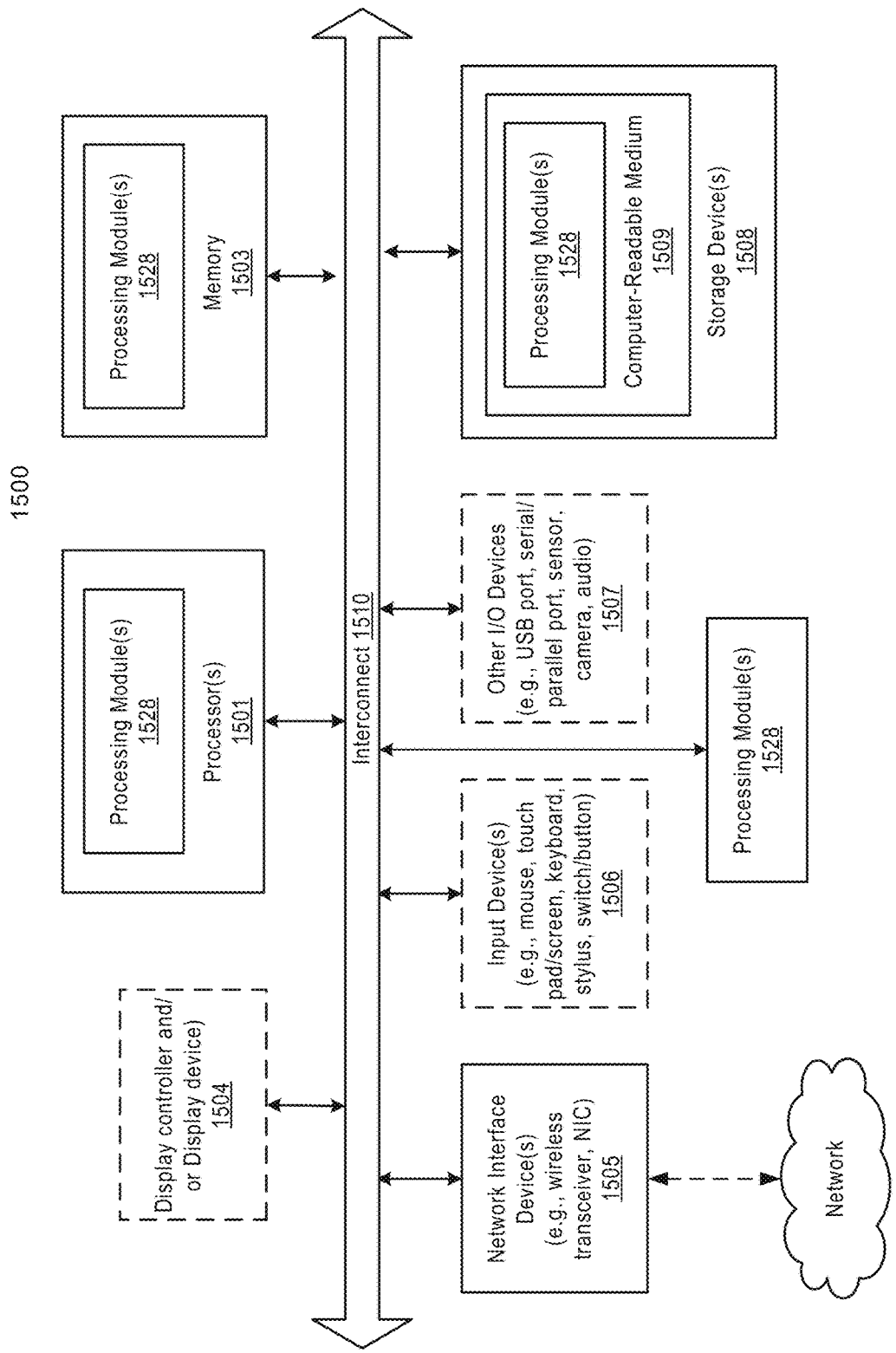
FIG. 9 is a block diagram illustrating an example of a data processing system which may be used with one embodiment of the invention.

FIG. 9 is a block diagram illustrating an example of a data processing system 1500 which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a FaaS module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of exporting log messages in real time in a micro services system, comprising:
    receiving, by a data protect manager, a request for exporting log messages related to a job completed in the micro services system, the request including a plurality of attributes of the job;
    retrieving, by the data protect manager, one or more micro services from a mapping table based on values of the plurality of attributes, wherein the mapping table includes an entry for each unique combination of values of the plurality of attributes, the entry mapping the unique combination to a set of micro services;
    selecting, by the data protect manager, a first set of one or more log files corresponding to the one or more micro services from a plurality of log files generated by the micro services system;
    selecting, by the data protect manager, a second set of one or more log files from the first set of one or more log files, each of the second set of one or more log files generated within a period of time between a start time and an end time of the job; and
    retrieving log messages containing an identifier of the job from the second set of one or more log files.

2. The computer-implemented method of claim 1, wherein the plurality of attributes include a job type, an asset type, a mode of trigger, and a job status.

3. The computer-implemented method of claim 1, wherein the mapping table is generated by the data protect manager from a plurality of log files generated by the micro services system in one or more system non-busy periods of time in the past.

4. The computer-implemented method of claim 3, wherein each of the one or more system non-busy times is determined based on configurations for jobs that generated the plurality of log files in the past.

5. The computer-implemented method of claim 3, wherein the mapping table is generated by the data protect manager from a plurality of log files generated by the micro services system using one or more low-priority threads.

6. The computer-implemented method of claim 1, wherein the request for exporting log messages related to the job identifier is made via a graphical user interface of the data protect manager by a user checking a check box.

7. The computer-implemented method of claim 6, wherein the data protect manager runs on a single instance of virtual machines, and wherein the job is one of a backup job, a restore job, a replication job, a cloud tiering job, and a cloud disaster recovery job.

8. A non-transitory machine-readable medium having instructions stored therein, which when executed by a processor, cause the processor to perform operations of exporting log messages in real time in a micro services system, comprising:
    receiving, by a data protect manager, a request for exporting log messages related to a job completed in the micro services system, the request including a plurality of attributes of the job;
    retrieving, by the data protect manager, one or more micro services from a mapping table based on values of the plurality of attributes, wherein the mapping table includes an entry for each unique combination of values of the plurality of attributes, the entry mapping the unique combination to a set of micro services;
    selecting, by the data protect manager, a first set of one or more log files corresponding to the one or more micro services from a plurality of log files generated by the micro services system;
    selecting, by the data protect manager, a second set of one or more log files from the first set of one or more log files, each of the second set of one or more log files generated within a period of time between a start time and an end time of the job; and
    retrieving log messages containing an identifier of the job from the second set of one or more log files.

9. The non-transitory machine-readable medium of claim 8, wherein the plurality of attributes include a job type, an asset type, a mode of trigger, and a job status.

10. The non-transitory machine-readable medium of claim 8, wherein the mapping table is generated by the data protect manager from a plurality of log files generated by the micro services system in one or more system non-busy periods of time in the past.

11. The non-transitory machine-readable medium of claim 10, wherein each of the one or more system non-busy times is determined based on configurations for jobs that generated the plurality of log files in the past.

12. The non-transitory machine-readable medium of claim 10, wherein the mapping table is generated by the data protect manager from a plurality of log files generated by the micro services system using one or more low-priority threads.

13. The non-transitory machine-readable medium of claim 8, wherein the request for exporting log messages related to the job identifier is made via a graphical user interface of the data protect manager by a user checking a check box.

14. The non-transitory machine-readable medium of claim 13, wherein the data protect manager runs on a single instance of virtual machines, and wherein the job is one of a backup job, a restore job, a replication job, a cloud tiering job, and a cloud disaster recovery job.

15. A data processing system, comprising:
    a processor; and
    a memory coupled to the processor to store instructions, which when executed by the processor, cause the processor to perform operations of exporting log messages in real time in a micro services system, comprising:
    receiving, by a data protect manager, a request for exporting log messages related to an identifier of a job completed in the micro services system, the request including a plurality of attributes of the job;
    retrieving, by the data protect manager, one or more micro services from a mapping table based on values of the plurality of attributes, wherein the mapping table includes an entry for each unique combination of values of the plurality of attributes, the entry mapping the unique combination to a set of micro services;
    selecting, by the data protect manager, a first set of one or more log files corresponding to the one or more micro services from a plurality of log files generated by the micro services system;
    selecting, by the data protect manager, a second set of one or more log files from the first set of one or more log files, each of the second set of one or more log files generated within a period of time between a start time and an end time of the job; and
    retrieving log messages containing an identifier of the job from the second set of one or more log files.

16. The data processing system of claim 15, wherein the plurality of attributes include a job type, an asset type, a mode of trigger, and a job status.

17. The data processing system of claim 15, wherein the mapping table is generated by the data protect manager from a plurality of log files generated by the micro services system in one or more system non-busy periods of time in the past.

18. The data processing system of claim 17, wherein each of the one or more system non-busy times is determined based on configurations for jobs that generated the plurality of log files in the past.

19. The data processing system of claim 15, wherein the mapping table is generated by the data protect manager from a plurality of log files generated by the micro services system using one or more low-priority threads.

20. The data processing system of claim 15, wherein the request for exporting log messages related to the job identifier is made via a graphical user interface of the data protect manager by a user checking a check box.

* * * * *